UNITED STATES PATENT OFFICE.

WILLIAM HAYMAN, OF TAUNTON, MASSACHUSETTS, ASSIGNOR TO HIMSELF AND WILLIAM R. BLACK, OF SAME PLACE.

IMPROVEMENT IN COMPOSITIONS FOR PRESERVING WOOD.

Specification forming part of Letters Patent No. 110,652, dated January 3, 1871.

*To all persons to whom these presents may come:*

Be it known that I, WILLIAM HAYMAN, of Taunton, of the county of Bristol and State of Massachusetts, have invented or discovered a new and useful Composition for the Preservation of the Surfaces of Wood or other substances under exposure to the weather or to sea-water; and I do hereby declare the same to be fully described as follows:

In making the composition, I use coal-tar, forty gallons; naphtha or benzine, ten gallons; silicate of soda, dissolved in twelve gallons of water, so as to make a solution of 8° Baumé; lime, sixty-two ounces; and sulphate of iron, seven pounds.

In combining the above ingredients, first thoroughly mix the coal-tar and naphtha or benzine together. Next mix the lime and the sulphate of iron together and with the solution of soda, after which add to the mixture that of the coal-tar and naphtha or benzine.

In some cases, or for some purposes, a good composition may be made with all the ingredients except the lime; but I prefer to use the latter, as the composition is much improved thereby for general use.

To the composition, if desirable, any pigment may be added, or instead thereof, a quantity of ground marble, slate, or steatite may be substituted.

In using the composition, it is to be applied by means of a brush, or in other ways, as paint is generally spread on a surface.

I do not confine my invention to the precise proportions of the ingredients as hereinbefore set forth, as they may be varied somewhat without producing any material change in the principle or character of the composition.

I claim as my invention—

The said composition made of the ingredients and in the manner substantially as hereinbefore explained.

WILLIAM HAYMAN.

Witnesses:
 R. H. EDDY,
 S. N. PIPER.